F. S. CORNWELL.
DIAL FOR WATCHES OR CLOCKS.
APPLICATION FILED DEC. 18, 1911.
1,024,558.
Patented Apr. 30, 1912.
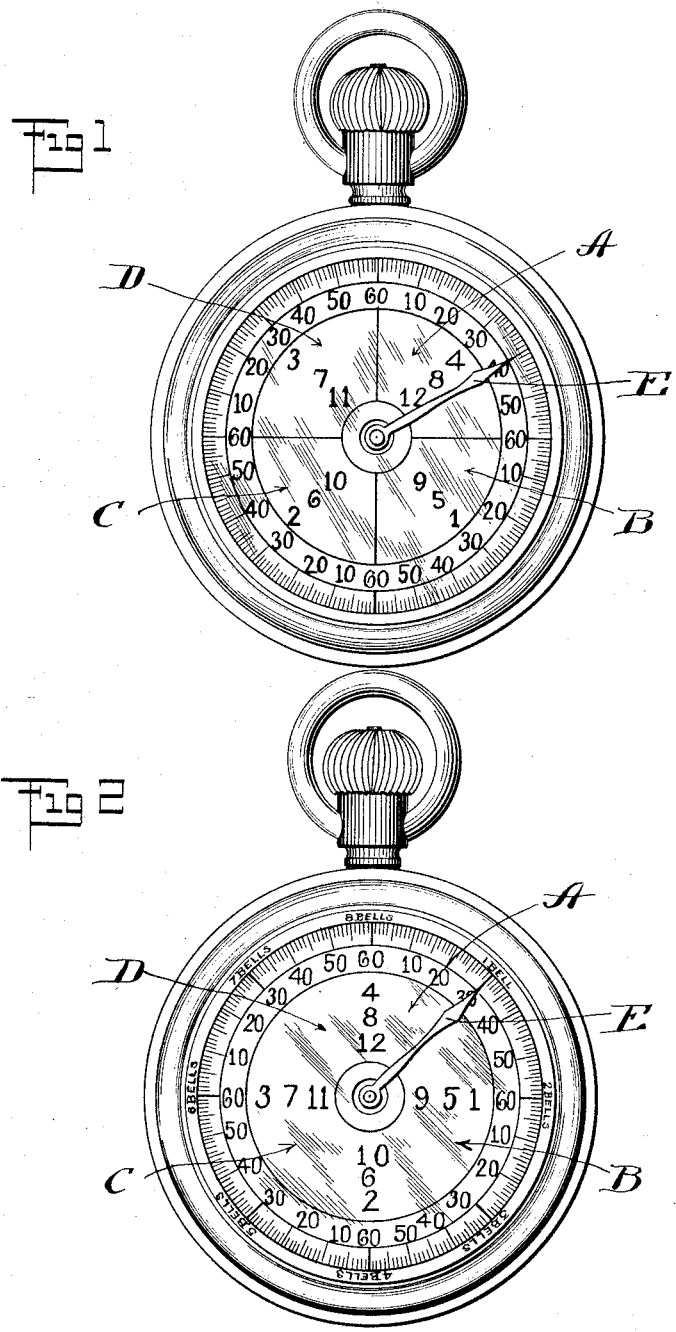

UNITED STATES PATENT OFFICE.

FRANK S. CORNWELL, OF NEW HAVEN, CONNECTICUT.

DIAL FOR WATCHES OR CLOCKS.

1,024,558.  Specification of Letters Patent.  Patented Apr. 30, 1912.

Application filed December 18, 1911. Serial No. 666,331.

*To all whom it may concern:*

Be it known that I, FRANK S. CORNWELL, a citizen of the United States, residing at New Haven, county of New Haven, Connecticut, have invented certain new and useful Improvements in Dials for Watches or Clocks, of which the following is a full, clear, and exact description.

My invention relates to an improved dial for use on clocks and watches.

The main object of the invention is to provide a dial which conforms to the system of time used on board ship, so that where the striking apparatus is used, said striking apparatus may operate after the manner of a ship's bell to indicate the time, although this is not imperative.

Another important advantage of my invention is that by the use of my improved dial, only a single pointer is required, thereby simplifying the clock movement.

In the drawing: Figure 1 is a front elevation of a watch illustrating one form of my improved dial. Fig. 2 is a similar view showing another form.

In the preferred construction, and in both forms shown, the dial, which is of circular form, is divided into four quadrants A, B, C and D. The arc of each division or quadrant may be divided into arbitrary graduations to indicate minutes, as shown by the sixty small graduations; so also more conspicuous graduations may be employed to indicate, for example, ten minutes and multiples thereof.

E represents the pointer which is driven by a suitable movement in such a manner as to traverse each division or quadrant in one hour. Thus, in the form shown, the pointer will make a complete circuit of the dial in four hours. When the pointer enters the quadrant A, for example, and while it is therein, it is either, 4, 8 or 12 o'clock, and as many minutes more as indicated by the particular position of the pointer in said quadrant. When the pointer enters quadrant B, the user knows that it is 1, 5 or 9 o'clock. Division C indicates either 2, 6 or 10 o'clock, while division D indicates either 3, 7 or 11 o'clock. As I have already said, the dial in its preferred form facilitates the reading of ship's time, and when the dial is divided into quadrants, as shown, one complete circuit of the dial represents a period of four hours, and covers the time from one bell to eight bells inclusive.

As shown in Fig. 2, the dial may readily have indications thereon corresponding to the ship's bell, and this without confusion, for at eight bells it is always either 4, 8 or 12 o'clock, at two bells it is always either 1, 5 or 9 o'clock, and so on.

It will be apparent that there will be no more confusion in reading the time by this dial and with the use of a single pointer, than occurs on board ship when the bells are struck. Any one instinctively knows practically what four-hour period of the day it is, and hence the particular number of bells sounded in that period will indicate to him the particular time of the day. So also in reading the dial for the particular minute, no difficulty will be experienced, because the user, who instinctively knows what particular four-hour period of the day that it is, would instinctively know that the pointer, as shown in Fig. 1, means that it is forty minutes past 4 or 8 or 12, and in reading the dial as shown in Fig. 2, he would know that it is thirty minutes past one of those four hours, the particular hour being easily determined by him by instinct, precisely as on board ship.

What I claim is:

1. A dial for a time piece, divided into hour quadrants, and a plurality of hour indications for each quadrant respectively, the successive hour indications being arranged in successive quadrants.

2. A dial for a time piece, divided into hour quadrants, a plurality of hour indications for each quadrant respectively, the successive hour indications being arranged in successive quadrants, and a plurality of minute graduations for each quadrant.

FRANK S. CORNWELL.

Witnesses:
  GEO. A. WHITNEY,
  JANE V. MCCARTHY.

---

Copies of this patent may be obtained for five cents each, by addressing the "Commissioner of Patents, Washington, D. C."